United States Patent
Ishiyama et al.

[11] Patent Number: 5,321,553
[45] Date of Patent: Jun. 14, 1994

[54] ZOOM LENS

[75] Inventors: Toshiro Ishiyama; Kenzaburo Suzuki, both of Tokyo, Japan

[73] Assignee: Nikon Corporation, Tokyo, Japan

[21] Appl. No.: 26,593

[22] Filed: Mar. 5, 1993

[30] Foreign Application Priority Data

Mar. 10, 1992 [JP] Japan .................................. 4-051441

[51] Int. Cl.$^5$ .............................................. G02B 15/14
[52] U.S. Cl. .................................... 359/684; 359/691; 359/677
[58] Field of Search ............... 359/691, 676, 677, 683, 359/684, 708

[56] References Cited

U.S. PATENT DOCUMENTS

| | | | |
|---|---|---|---|
| 4,159,865 | 7/1979 | Kawamura et al. | 359/680 |
| 4,400,064 | 8/1983 | Ikemori et al. | 359/681 |
| 4,999,007 | 3/1991 | Aoki et al. | 359/676 |
| 5,046,833 | 9/1991 | Tsuchida | 359/654 |
| 5,054,897 | 10/1991 | Ozawa | 359/676 |
| 5,076,677 | 12/1991 | Sato | 359/680 |
| 5,155,629 | 10/1992 | Ito et al. | 359/676 |

FOREIGN PATENT DOCUMENTS

| | | |
|---|---|---|
| 3127140 | 3/1982 | Fed. Rep. of Germany . |
| 2466785 | 4/1981 | France . |
| 2062280 | 5/1981 | United Kingdom . |

Primary Examiner—Bruce Y. Arnold
Assistant Examiner—Evelyn A. Lester
Attorney, Agent, or Firm—Shapiro and Shapiro

[57] ABSTRACT

In a zoom lens having a lens unit of negative refractive power most adjacent to the object side, distortion can be corrected better and an excellent imaging performance is maintained. In a zoom lens having a lens unit of negative refractive power most adjacent to the object side, a negative lens whose image side surface in contact with air is formed by a concave surface is provided in the lens unit of negative refractive power, and the shape of the concave surface of the negative lens is made into an aspherical surface which satisfies the condition that $-5 < \kappa < 0.75$ with regard to a cone constant $\kappa$ and of which the curvature monotonically decreases away from the optical axis.

7 Claims, 10 Drawing Sheets

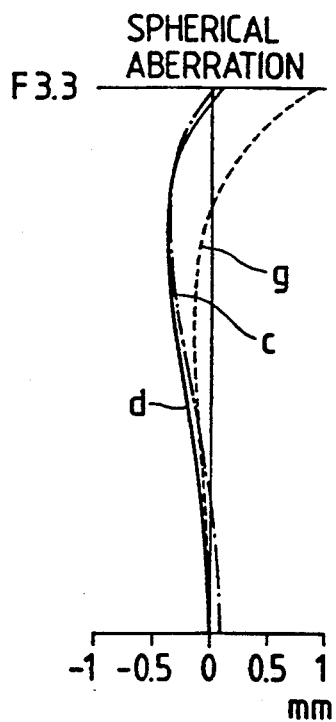 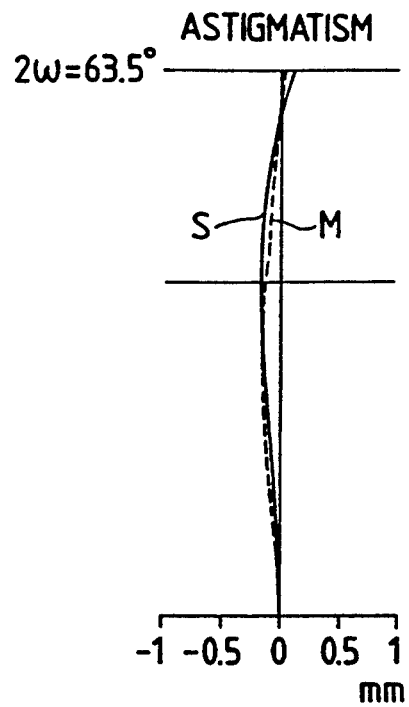 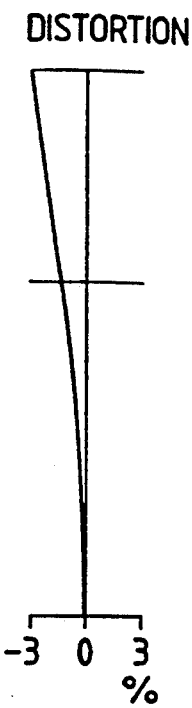
FIG. 2(a)  FIG. 2(b)  FIG. 2(c)
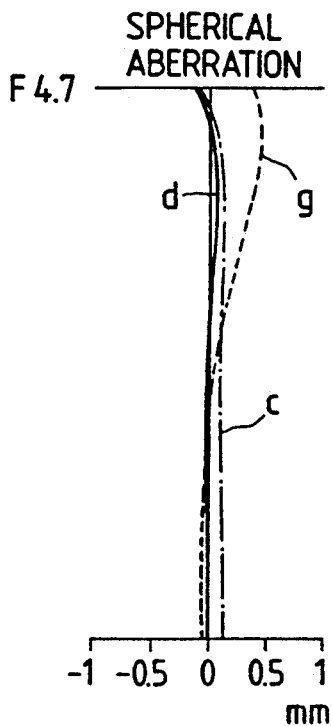 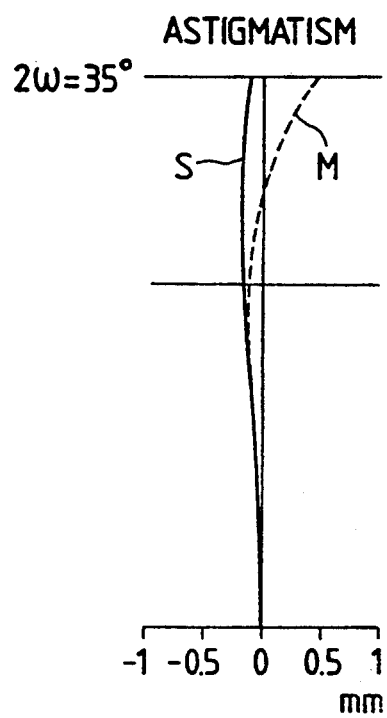 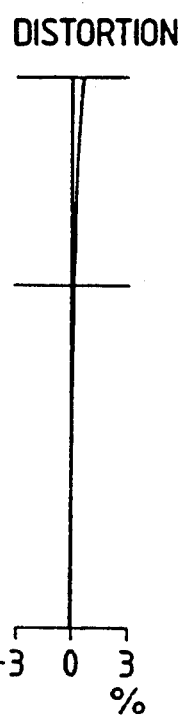
FIG. 2(d)  FIG. 2(e)  FIG. 2(f)

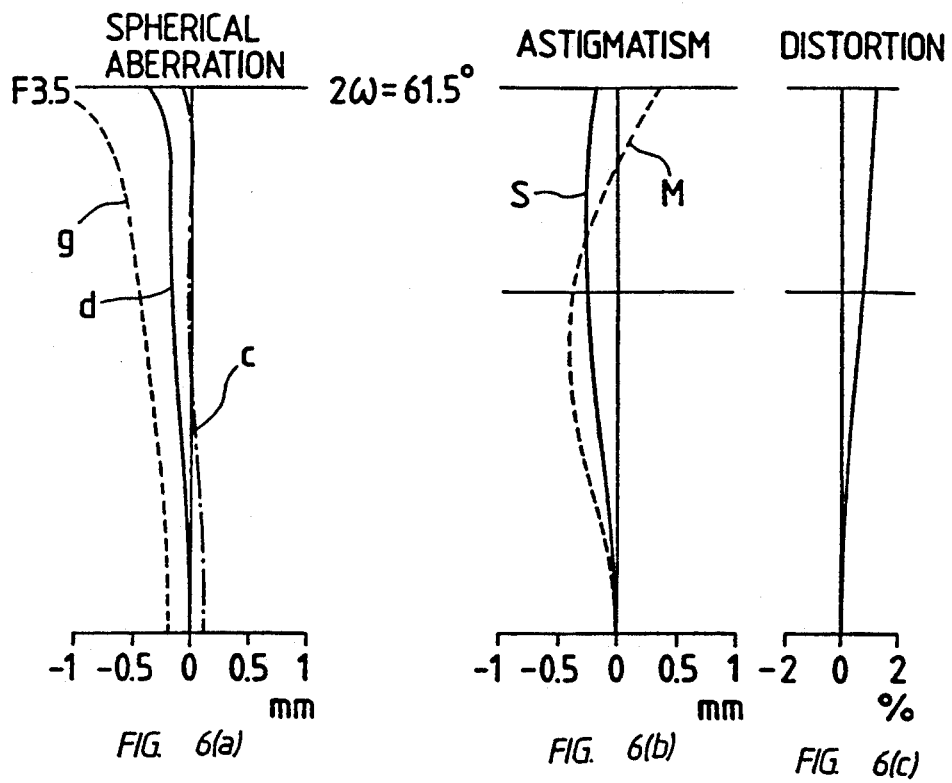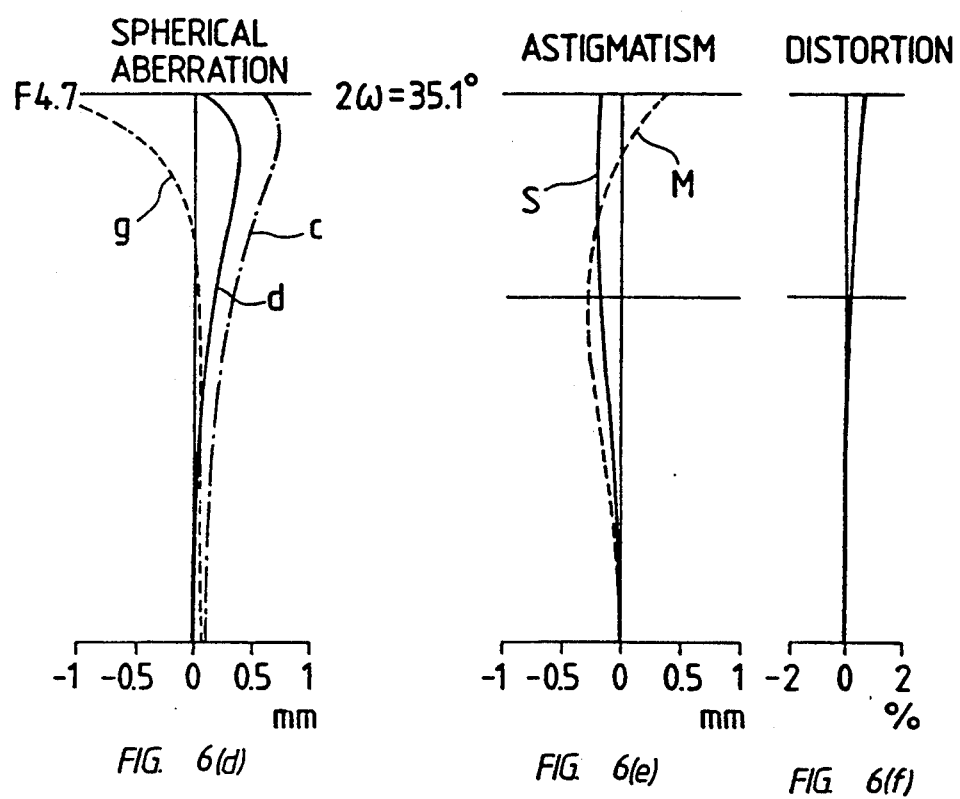

FIG. 8(a) SPHERICAL ABERRATION F2.9, curves d, g, c

FIG. 8(b) ASTIGMATISM 2ω=94.5°, M, S

FIG. 8(c) DISTORTION

FIG. 8(d) SPHERICAL ABERRATION F2.9, curves d, g, c

FIG. 8(e) ASTIGMATISM 2ω=64.6°, S, M

FIG. 8(f) DISTORTION

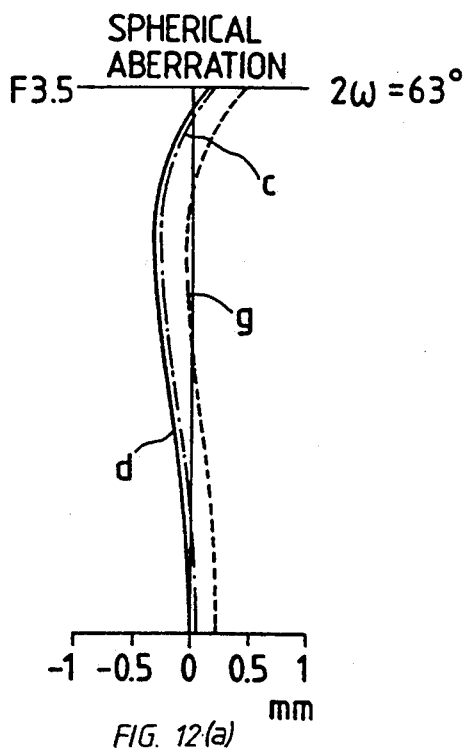
FIG. 12(a)  FIG. 12(b)  FIG. 12(c)
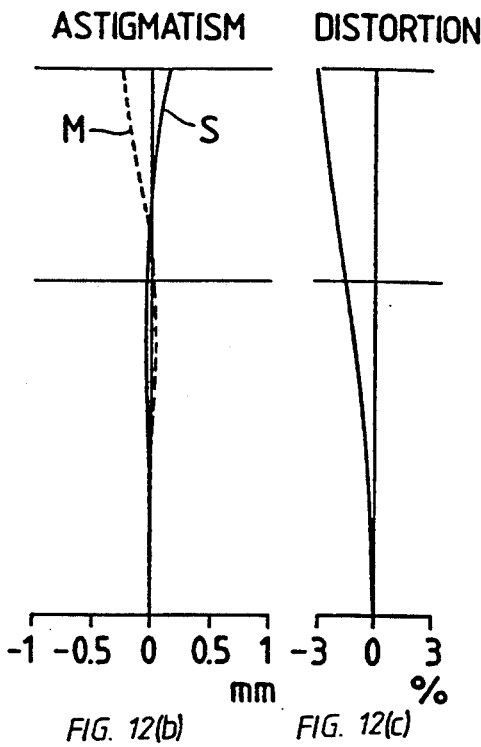
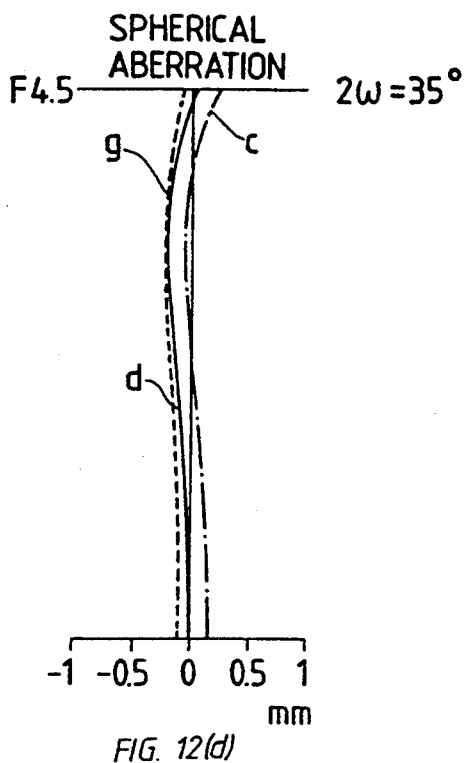
FIG. 12(d)  FIG. 12(e)  FIG. 12(f)
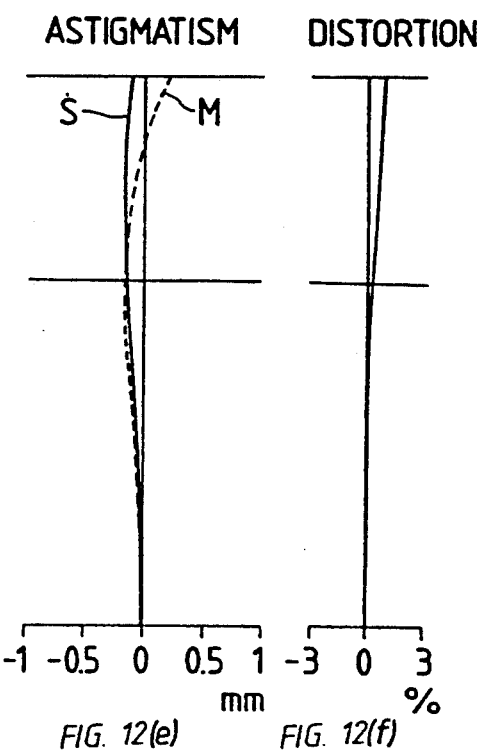

ZOOM LENS

BACKGROUND OF THE INVENTION

1. Field of the Invention

This invention relates to a zoom lens for use, for example, in a single-lens reflex camera, an electronic still camera, a video camera or the like.

2. Related Background Art

Some of zoom lenses in which a lens unit having negative refractive power precedes have a relatively great angle of view. In order to obtain a great back focal length, this forward negative refractive power has the action of decrease the angle of view relative to a rearward lens unit and turning the correction of curvature of image field and Petzval sum to the negative, and is suitable for aberration correction of a wide angle of view. Therefore, a lens construction in which a lens unit of negative refractive power is disposed most adjacent to the object side is adopted as a lens for a wide angle of view.

In this case, however, negative distortion occurs due to the negative refractive power most adjacent to the object side, and the angle of view increases and the bad influence thereof appears more remarkably. Therefore, use is made of a technique of disposing a positive lens near a negative lens to thereby mitigate the turning of distortion to the negative and correct distortion. This technique is considerably effective for aberration correction, but the addition of the positive lens increases the number of lenses and increases the volume of the lens, and this has led to the problem that the construction of the lens becomes complicated and the manufacturing cost is increased. Also, in a super-wide angle zoom lens, the correction of distortion is still insufficient even with the above-described correcting method, and the designing thereof has been extremely difficult and it has been difficult to maintain a good imaging performance.

SUMMARY OF THE INVENTION

It is the object of the present invention to provide a zoom lens having a lens unit of negative refractive power most adjacent to the object side and which can correct distortion better and has an excellent imaging performance.

The zoom lens according to the present invention is a zoom lens having a lens unit of negative refractive power most adjacent to the object side and a lens unit of positive refractive power disposed on the image side thereof, and when the focal length of the entire system is to be varied, the positive lens unit and the negative lens unit are moved relative to each other along the optical axis. The lens unit of negative refractive power has a negative lens having its image side surface in contact with air formed by a concave surface, and the shape of the concave surface of said negative lens is such that the curvature of the concave surface of said negative lens monotonically decreases away from the optical axis. Specifically, when the distance in the direction of the optical axis from the vertex of the curved surface at a distance y on the curved surface from the optical axis is x and the curvature of said curved surface at the vertex thereof is C and $C_4, C_6, \ldots$ are constants and $\kappa$ is a cone constant and x is expressed as $$x = Cy^2/\{1+(1-\kappa C^2 y^2)^{\frac{1}{2}}\} + C_4 y^4 + C_6 y^6 + \ldots$$

the shape of the concave surface of said negative lens is set within a range represented by $$-5 < \kappa < 0.75 \quad (1)$$

By constructing the aspherical shape of the image side concave surface of the negative lens in the lens unit most adjacent to the object side as described above, it becomes easy to correct distortion well even for a wide angle of view. A sharp increase in distortion with an increase in the angle of view is attributable to the fact that the curvature of the spherical surface is constant. The aspherical surface heretofore introduced into the negative lens unit most adjacent to the object side with a view to correct distortion has been such that a spherical surface is adopted as the basic shape of the curved surface and yet the displacement from this spherical surface is small. Therefore, it has had only such a degree of meaning that auxiliary aberration correction is effected by the aspherical surface, for a system comprised of only a spherical surface.

In contrast, in the present invention, with regard to the shape of the concave surface of the negative lens, the basic shape is made not spherical as expressed by expression (1) above. Although the action of the aspherical shape in the present invention will hereinafter be described, the lens is rotation-symmetrical with respect to the optical axis and therefore, it will suffice to prescribe only a two-dimensional curve in the meridional cross-section. According, in the following description, the shape of a rotation-symmetrical aspherical surface is evaluated by a consideration on the curve of the meridional cross-section.

Generally, a quadratic curve is divided broadly into a circle (k=1), an ellipse (1<k, 0<k<1), a parabola (k=0) and a hyperbola (k<0). Of these, it is three except a circle that the curvature monotonically decreases as it becomes far from the optical axis, but in the case of an ellipse, the major axis and the optical axis must be coincident with each other. Also, a hyperbola has a straight asymptote and the variation in the curvature thereof is small at points sufficiently far from the optical axis and therefore, if this tendency becomes strong, the deflection angles of principal rays of different angles of view will become substantially the same. That is, in a curved surface having such a straight line as a cross-sectional shape, the difference in curvature between the central portion and the marginal portion is too great and the difference between the intermediate portion and the marginal portion is small and as a result, curvature of image field and distortion become great and the correction thereof becomes difficult. However, in an area not very near to the asymptote practically good correction is possible. Accordingly, a curve suitable for the aspherical surface to be introduced into the present invention is an ellipse in which the major axis is coincident with the optical axis or a parabola, and further, is an area of a hyperbola which is relatively near to the optical axis. Furthermore, even in an ellipse, the effect is small in the area thereof which is approximate to a circle.

From such a point of view, it has been found that in the present invention, the condition of expression (1) is satisfied as the range of the cone constant $\kappa$, whereby the good correction of distortion becomes possible. If the upper limit of this condition is exceeded, the reference surface will become approximate to a spherical surface and therefore, the effect of the present invention will become small and the good correction of distortion will become difficult. On the other hand, if the lower limit of this condition is departed from, the hyperbola will become approximate to a straight line close to an asymptote and therefore, it will become difficult to suitably bend an oblique light beam over a wide range of the angle of view and the moderate correction of distortion, curvature of image field and coma will become difficult.

When the second and subsequent high-order terms in the above-mentioned aspherical surface expression enter, the curve becomes not a quadratic curve, but under the condition that it is contained between two curves determined from the upper and lower limits of the value of $\kappa$ by conditional expression (1) and the curvature monotonically decreases relative to the distance y from the optical axis, the curve may be modified as required by adding a high-order term regarding y, and of course, better aberration correction is possible because the degree of freedom of aberration correction becomes higher. In this case, more practically, it is preferable that k be in the range of $0 \leq k < 0.75$. With regard to the other basic construction as a zoom lens and the specific lens construction of each lens unit, it is possible to use heretofore known various means.

In the basic construction of the present invention as described above, a super-wide angle zoom lens of which the angle of view exceeds 90° requires stronger negative refractive power in the forward unit thereof, but at this time, it becomes more difficult to correct distortion sufficiently. However, by introducing an aspherical surface as shown by the above-mentioned condition, necessary negative refractive power can be provided and the occurrence of distortion can be suppressed. A zoom lens comprising two negative and positive units in succession from the object side, a four-unit zoom lens having a unit construction of negative, positive, negative, positive or a zoom lens comprising three negative, positive and positive units is practical as a zoom lens having a lens unit of negative refractive power most adjacent to the object side, and in these zoom lenses, it is desirable to further satisfy the following condition:

$$0.5 < |fasp/fw| < 2.0, \quad (2)$$

where
fw: the focal length of the entire system at the wide angle side;
fasp: the inverse number of the on-axis refractive power of the aspherical surface.

If the upper limit of this condition is exceeded, the curvature of the aspherical surface will become small and the difference thereof from a spherical surface will become small and therefore, the effect of the aspherical surface according to the present invention will become small and the good correction of distortion will become difficult. If the lower limit of this condition is exceeded, appropriate bending in aberration correction will become unobtainable.

The first lens unit having negative refractive power is effective to obtain a long back focal length particularly for a single-lens reflex camera, and the greater becomes the angle of view, that is, the smaller becomes the focal length of the entire system relative to the back focal length, the greater negative refractive power is required forwardly. This tendency differs more or less depending on brightness and construction, but it is preferable that the negative lens having the aspherical surface as described above which is included in the negative lens unit most adjacent to the object side further satisfy the following condition:

$$0.5 < |fA/fw| < 2.5, \quad (3)$$

where fA: the focal length of the negative lens having the aspherical surface.

If the upper limit of this condition is exceeded, sufficient negative refractive power for obtaining a great back focal length cannot be obtained or the difference from the prior art will become small. If the lower limit of this condition is exceeded, various aberrations occurring from the lens having this aspherical surface will become great and the correction thereof will become difficult.

Also, the correction effect for distortion by the aspherical negative lens in the present invention becomes greater as the angle of view becomes greater and particularly, a zoom lens comprising four negative, positive, negative and positive units in succession from the object side is effective for providing a super-wide angle, and as shown in embodiments which will be described later, a zoom lens having an angle of view exceeding 90° becomes possible. In such a zoom lens of four-unit construction, it is suitable to make a three-lens construction in which a negative meniscus lens having its convex surface facing the object side is disposed most adjacent to the object side of the first lens unit G1 of negative refractive power, an aspherical surface as described above is provided on the image side concave surface thereof and another negative lens and a positive lens are disposed on the image side thereof. In this construction, it is desirable to satisfy the following conditions:

$$3.5 < fp/fw < 4.5 \quad (4)$$

$$2.5 < |fn|/fw < 4.5, \quad (5)$$

where
fp: the focal length of the positive lens in the first lens unit,
fn: the focal length of the image side negative lens in the first lens unit.

If the upper limit of conditional expression (4) above is exceeded, the focal length of the positive lens in the first lens unit will become too great as compared with the focal length of the entire system and therefore, not only Petzval sum will increase in the negative direction, but also introversive coma will become apt to occur in the ray flux under the principal ray and good correction will become difficult. If the lower limit of this condition is departed from, the focal length of the positive lens will become too small relative to the focal length of the entire system and not only Petzval sum will become excessively great in the positive direction, but also extroversive coma will occur in the ray flux under the principal ray at the wide angle end and therefore, good correction will become difficult.

If the upper limit of conditional expression (5) above is exceeded, the refractive power of the image side positive lens in the first lens unit will become small relative to the refractive power of the entire system and Petzval sum will become great in the positive direction and also, extroversive coma will occur in the ray flux under the principal ray at the wide angle end. If conversely, the lower limit of this condition is departed from, the refractive power of the image side negative lens will become too strong relative to the refractive power of the entire system and Petzval sum will become great in the negative direction and introversive coma will occur in the ray flux under the principal ray at the wide angle end.

BRIEF DESCRIPTION OF THE DRAWINGS

FIGS. 2(a)-2(c) and FIGS. 2(d)-2(f) show various aberrations at the wide angle end and telephoto end, respectively, of the first embodiment.

FIGS. 6(a)-6(c) and FIGS. 6(d)-6(f) show various aberrations at the wide angle end and telephoto end, respectively, of the third embodiment.

FIGS. 8(a)-8(c) and FIGS. 8(d)-8(f) show various aberrations at the wide angle end and telephoto end, respectively, of the fourth embodiment.

FIGS. 12(a)-12(c) and FIGS. 12(d)-12(f) show various aberrations at the wide angle end and telephoto end, respectively, of the sixth embodiment.

DESCRIPTION OF THE PREFERRED EMBODIMENTS

Some embodiments of the present invention will hereinafter be described.

Figure 1:
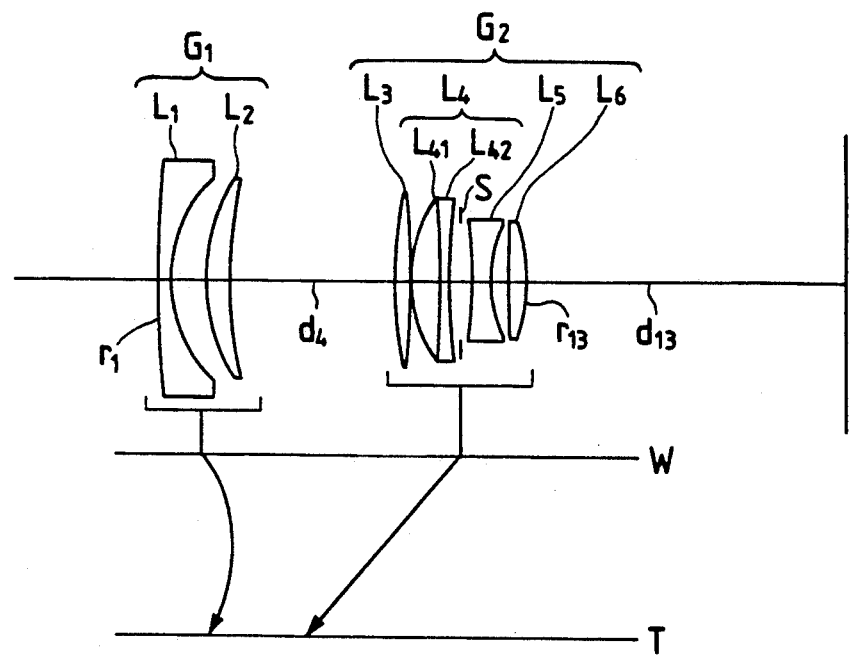
FIG. 1 shows the lens construction of a first embodiment of the present invention.

FIG. 1 shows the lens construction of a first embodiment and the movement locus of each lens unit by zooming. FIGS. 2(a)-2(c) and FIGS. 2(d)-2(f) show various aberrations at the wide angle end and telephoto end, respectively, of the first embodiment. As shown in FIG. 1, the first embodiment has, in succession from the object side, a first lens unit G1 of negative refractive power and a second lens unit G2 of positive refractive power including a stop S. The first embodiment is a zoom lens of two-unit construction in which the spacing d4 between the first lens unit G1 and the second lens unit G2 varies during zooming. The first lens unit G1 comprises, in succession from the object side, a negative meniscus lens L1 having its convex surface facing the object side, and a positive meniscus lens L2 also having its convex surface facing the object side. The second lens unit G2 comprises, in succession from the object side, a biconvex lens L3, a cemented lens L4 comprising a biconvex lens L41 and a biconcave lens L42 cemented together, a biconcave lens L5 and a biconvex lens L6.

When the focal length of the entire system in the embodiment of FIG. 1 is f and a value indicative of the brightness thereof is F value and the angle of view is $2\omega$ and the radius of curvature is ri and the spacing between adjacent surfaces is di and the refractive index is ndi and the Abbe number is $\nu$di, the values thereof are set as shown in Table 1 below. In Table 1, the value of an aspherical surface coefficient is also shown. In the table, the second surface given a mark * is an aspherical surface, and the value of r2 which is the radius of curvature thereof means the radius of curvature on the optical axis. Further, the values of d4 and back focal length d13 varied by zooming are also shown in the table in the relation thereof with the focal length of the entire system.

In the tables of numerical values below, the radius of curvature of the ith surface (i=1, 2, 3, ... ) from the object side is represented as ri, the spacing on the optical axis between the ith surface and the (i+1)th surface is represented as di, the refractive index of the medium between the ith surface and the (i+1)th surface for d line is represented as ndi, and the Abbe number of the medium between the ith surface and the (i+1)th surface is represented as $\nu$di (but the Abbe number $\nu$di of the air is represented as a blank). Also, the mark * represents an aspherical surface.

TABLE 1

(First Embodiment)
Focal length f = 36-68
F NO. = 3.3-4.7
$2\omega$ = 63.5°-35.0°

| i | ri | di | ndi | $\nu$di |
|---|---|---|---|---|
| 1 | 161.395 | 1.700 | 1.77279 | 49.45 |
| *2 | 17.499 | 5.000 | 1.00000 | |
| 3 | 25.389 | 3.000 | 1.75520 | 27.61 |
| 4 | 55.617 | variable | 1.00000 | |
| 5 | 52.870 | 2.500 | 1.62041 | 60.14 |
| 6 | −98.697 | 0.100 | 1.00000 | |
| 7 | 19.159 | 4.100 | 1.65160 | 58.50 |
| 8 | −120.000 | 1.100 | 1.64831 | 33.75 |
| 9 | 67.006 | 3.100 | 1.00000 | |
| 10 | −59.885 | 2.800 | 1.78250 | 28.34 |
| 11 | 18.799 | 2.400 | 1.00000 | |
| 12 | 137.320 | 2.600 | 1.61293 | 36.98 |
| 13 | −23.437 | | | |

$\kappa$ = 0.3481
C4 = 6.281 × 10 − 6
C6 = 2.631 × 10 − 8
C8 = −1.075 × 10 − 10
C10 = 3.079 × 10 − 13

| Focal length f of the entire system | 36 | 51.6 | 68 |
|---|---|---|---|
| d4 | 23.167 | 8.471 | 0.291 |
| d13 | 44.011 | 54.931 | 66.411 | fW = 36, fA = −25.53, |fA/fW| = 0.709
fasp = −23.17, |fasp/fw| = 0.643

Figure 3:
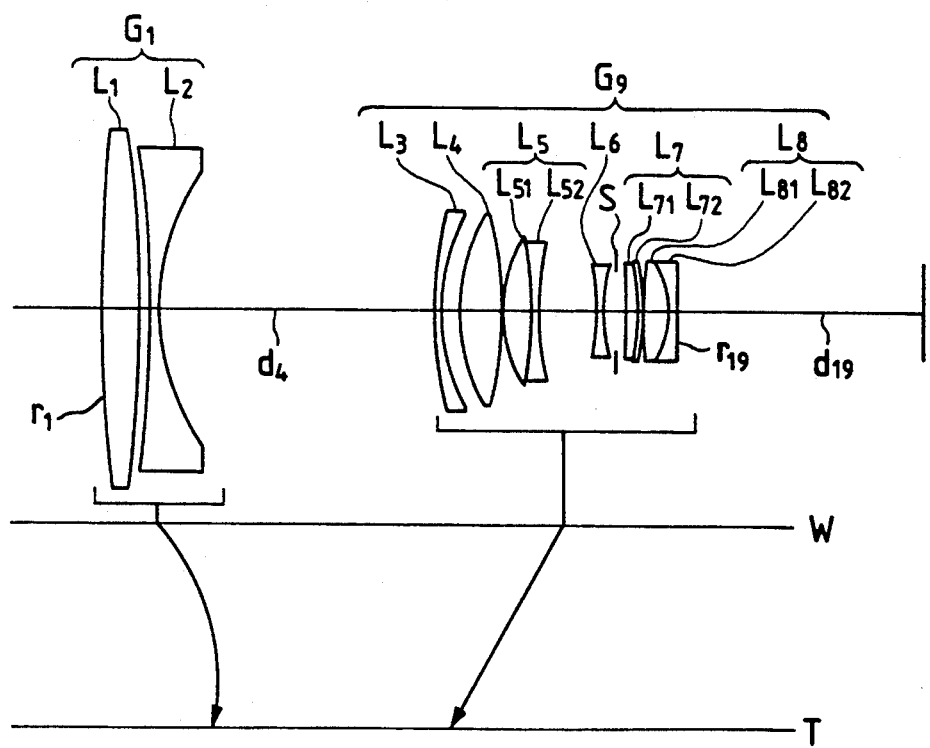
FIG. 3 shows the lens construction of a second embodiment of the present invention.
Figures 4A, 4B, 4C:
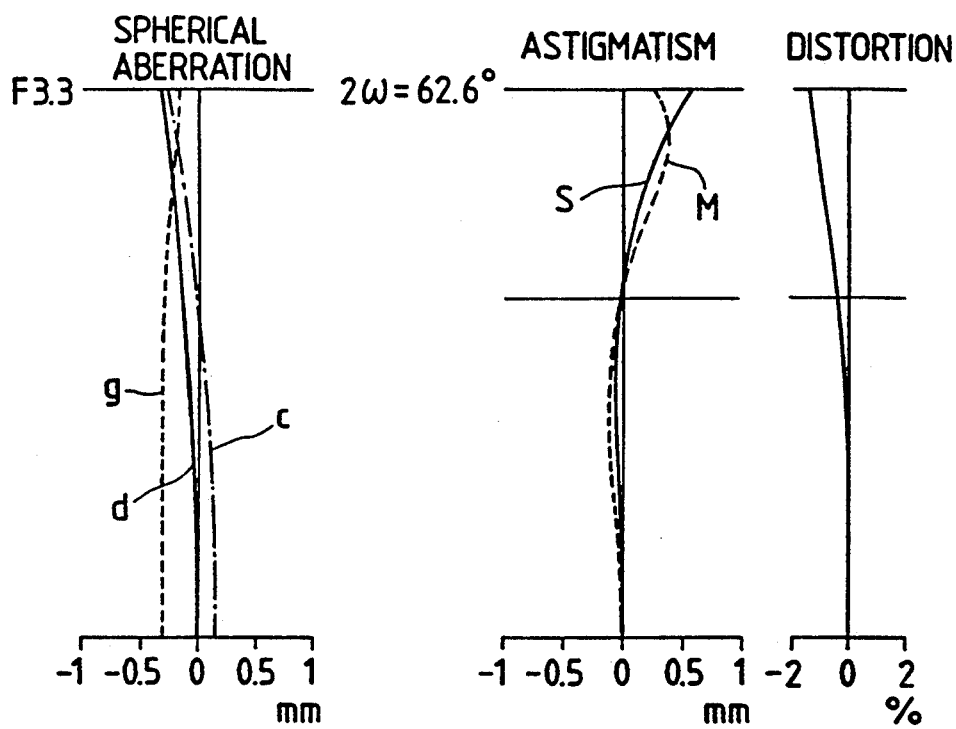
FIGS. 4(a)-4(c) and FIGS. 4(d)-4(f) show various aberrations at the wide angle end and telephoto end, respectively, of the second embodiment.
Figures 4D, 4E, 4F:
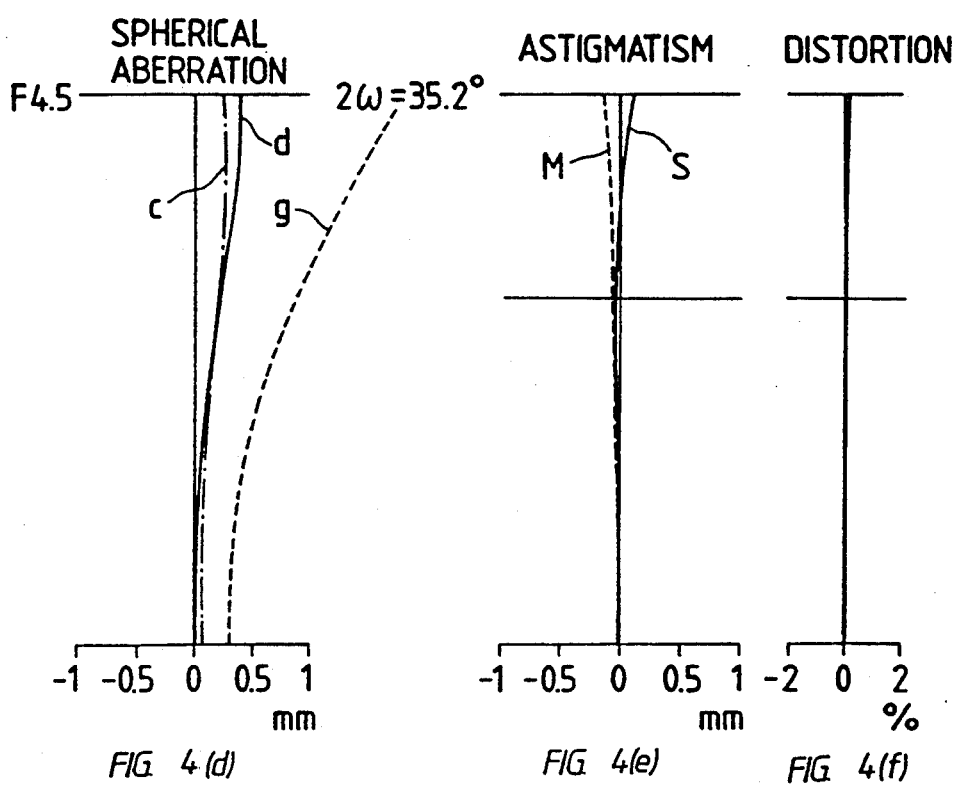

FIG. 3 shows the lens construction of a second embodiment and the movement locus of each lens unit by zooming. FIGS. 4(a)-4(c) and FIGS. 4(d)-4(f) show various aberrations at the wide angle side, respectively, and telephoto side of the second embodiment. As shown in FIG. 3, there are disposed, in succession from the object side, a first lens unit G1 of negative refractive power and a second lens unit G2 of positive refractive power including a stop S. The second embodiment is a zoom lens of two-concave-convex-unit construction in which the spacing d4 between the first lens unit G1 and the second lens unit G2 varies during zooming. The first lens unit G1 comprises, in succession from the object side, a biconvex lens L1 and a biconcave lens L2. The second lens unit G2 comprises, in succession from the object side, a negative meniscus lens L3 having its convex surface facing the object side, a biconvex lens L4, a cemented lens L5 comprising a biconvex lens L51 and a biconcave lens L52 cemented together, a biconcave lens L6, a cemented lens L7 comprising a positive meniscus lens L71 having its concave surface facing the object side and a negative meniscus lens L72 also having its concave surface facing the object side, the lenses L71 and L72 being cemented together, and a cemented lens L8 comprising a biconvex lens L81 and a negative meniscus lens L82 having its concave surface facing the object side, the lenses L81 and L82 being cemented together.

The focal length f of the entire system in the embodiment of FIG. 3, F value indicative of the brightness thereof, the angle of view 2ω, the radius of curvature ri, the spacing di between adjacent surfaces, the refractive index ndi, the Abbe number νdi and the aspherical surface coefficient are set as follows. The fourth surface given a mark * is an aspherical surface, and the value of r4 which is the radius of curvature thereof means the radius of curvature on the optical axis. Further, the values of d4 and back focal length d19 varied by zooming are represented in the relation thereof with the focal length of the entire system.

TABLE 2

(Second Embodiment)
Focal length f = 36–68
F NO. = 3.3–4.5
2ω = 62.6°–35.2°

| i | ri | di | ndi | νdi |
|---|---|---|---|---|
| 1 | 230.342 | 7.000 | 1.69895 | 30.04 |
| 2 | −202.742 | 1.500 | 1.00000 | |
| 3 | −194.411 | 1.493 | 1.74810 | 52.30 |
| *4 | 37.731 | variable | 1.00000 | |
| 5 | 59.250 | 1.200 | 1.74090 | 52.30 |
| 6 | 32.104 | 3.600 | 1.00000 | |
| 7 | 31.990 | 7.000 | 1.62041 | 60.14 |
| 8 | −66.819 | 0.500 | 1.00000 | |
| 9 | 22.906 | 5.000 | 1.62041 | 60.14 |
| 10 | −54.140 | 1.200 | 1.74400 | 45.00 |
| 11 | 47.588 | 10.048 | 1.00000 | |
| 12 | −50.947 | 1.500 | 1.74950 | 35.19 |
| 13 | 26.694 | 4.000 | 1.00000 | |
| 14 | −151.830 | 2.000 | 1.79504 | 28.57 |
| 15 | −35.000 | 1.000 | 1.80411 | 46.55 |
| 16 | −41.303 | 0.200 | 1.00000 | |
| 17 | 99.411 | 4.500 | 1.77279 | 49.45 |
| 18 | −14.213 | 1.700 | 1.72342 | 37.90 |
| 19 | −133.381 | | | |

$\kappa = 0.45$
$C4 = 0.000$
$C6 = 8.078 \times 10^{-10}$
$C8 = 0.000$
$C10 = 6.000 \times 10^{-16}$

| Focal length f of the entire system | 36 | 51.6 | 68 |
|---|---|---|---|
| d4 | 48.091 | 25.417 | 12.798 |
| d18 | 40.213 | 51.913 | 64.213 | fW = 36, fA = from −42.12, |fA/fW| = 1.170
fasp = −50.44, |fasp/fw| = 1.401

Figure 5:
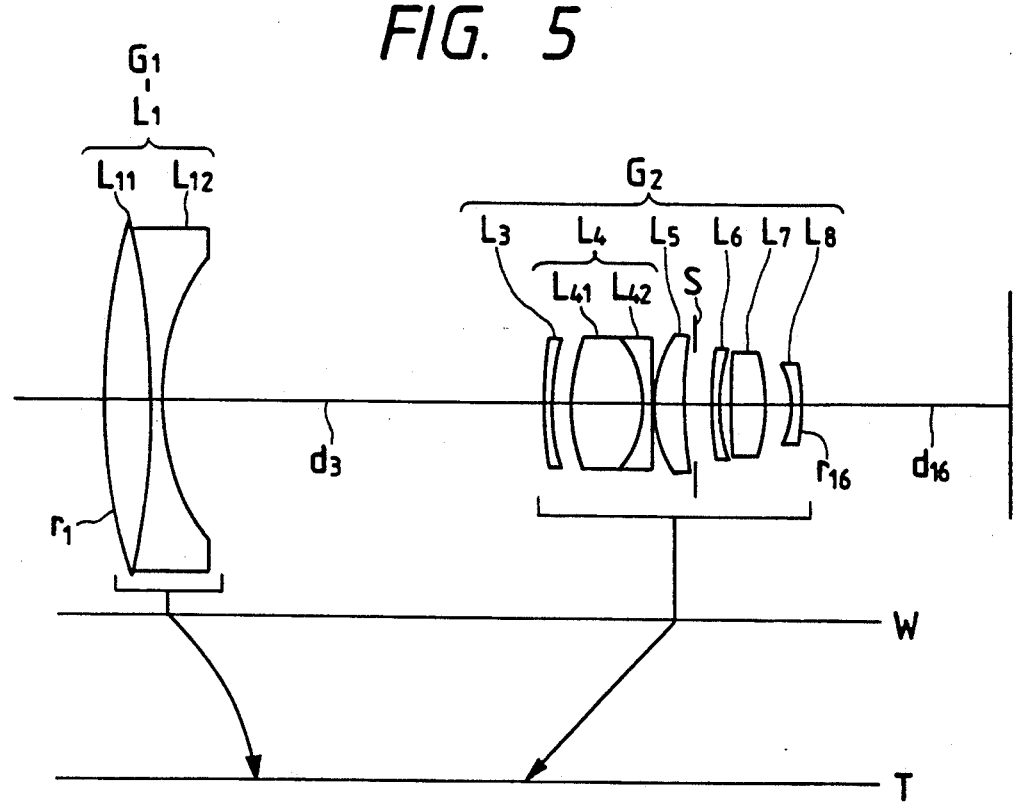
FIG. 5 shows the lens construction of a third embodiment of the present invention.

FIG. 5 shows the lens construction of a third embodiment and the movement locus of each lens unit by zooming. FIGS. 6(a)–6(c) and FIGS. 6(d)–6(f) show various aberrations at the wide angle side and telephoto side, respectively, of the third embodiment. As shown in FIG. 5, there are disposed, in succession from the object side, a first lens unit G1 of negative refractive power and a second lens unit G2 of positive refractive power including a stop S. This embodiment is a zoom lens of two-concave-convex-unit construction in which the spacing d3 between the first lens unit G1 and the second lens unit G2 varies during zooming. The first lens unit G1 comprises only a cemented lens L1 comprising, in succession from the object side, a biconvex lens L11 and a biconcave lens L12 cemented together. The second lens unit G2 comprises, in succession from the object side, a negative meniscus lens L2 having its convex surface facing the object side, a cemented lens L3 comprising a biconvex lens L41 and a biconcave lens L42 cemented together, a positive meniscus lens L4 having its convex surface facing the object side, a negative meniscus lens L5 having its convex surface facing the object side, a biconvex lens L6 and a negative meniscus lens L7 having its concave surface facing the object side.

The focal length f of the entire system in the embodiment of FIG. 5, F value indicative of the brightness thereof, the angle of view 2ω, the radius of curvature ri, the spacing di between adjacent surfaces, the refractive index ndi, the Abbe number νdi and the aspherical surface coefficient are set as follows. The third surface given a mark * is an aspherical surface, and the value of r3 which is the radius of curvature thereof means the radius of curvature on the optical axis. Further, the values of d3 and back focal length d16 varied by zooming are shown in the table below in the relation thereof with the focal length of the entire system.

TABLE 3

(Third Embodiment)
Focal length f = 36–68
F NO. = 3.5–4.7
2ω = 61.5°–35.1°

| i | ri | di | ndi | νdi |
|---|---|---|---|---|
| 1 | 99.130 | 8.700 | 1.64831 | 33.75 |
| 2 | −130.000 | 1.500 | 1.74810 | 52.30 |
| *3 | 37.557 | variable | 1.00000 | |
| 4 | 86.539 | 1.200 | 1.72000 | 50.19 |
| 5 | 34.235 | 3.500 | 1.00000 | |
| 6 | 28.784 | 13.000 | 1.62041 | 60.14 |
| 7 | −17.000 | 2.000 | 1.79668 | 45.37 |
| 8 | −199.985 | 0.200 | 1.00000 | |
| 9 | 18.820 | 5.537 | 1.62041 | 60.14 |
| 10 | 68.588 | 5.000 | 1.00000 | |
| 11 | 50.417 | 1.500 | 1.74950 | 35.19 |
| 12 | 22.630 | 2.000 | 1.00000 | |
| 13 | 90.000 | 6.626 | 1.74443 | 49.52 |
| 14 | −32.382 | 5.000 | 1.00000 | |
| 15 | −12.350 | 1.700 | 1.62041 | 60.14 |
| 16 | −30.384 | | | |

$\kappa = 0.34$
$C4 = -1.760 \times 10^{-7}$
$C6 = -6.515 \times 10^{-10}$
$C8 = -6.500 \times 10^{-13}$
$C10 = 0.000$

| Focal length f of the entire system | 36 | 51.6 | 68 |
|---|---|---|---|
| d3 | 68.613 | 40.270 | 24.495 |
| d16 | 38.218 | 47.578 | 57.418 | fW = 36, fA = −39.00, |fA/fW| = 1.083
fasp = −50.20, |fasp/fw| = 1.394

Figure 7:
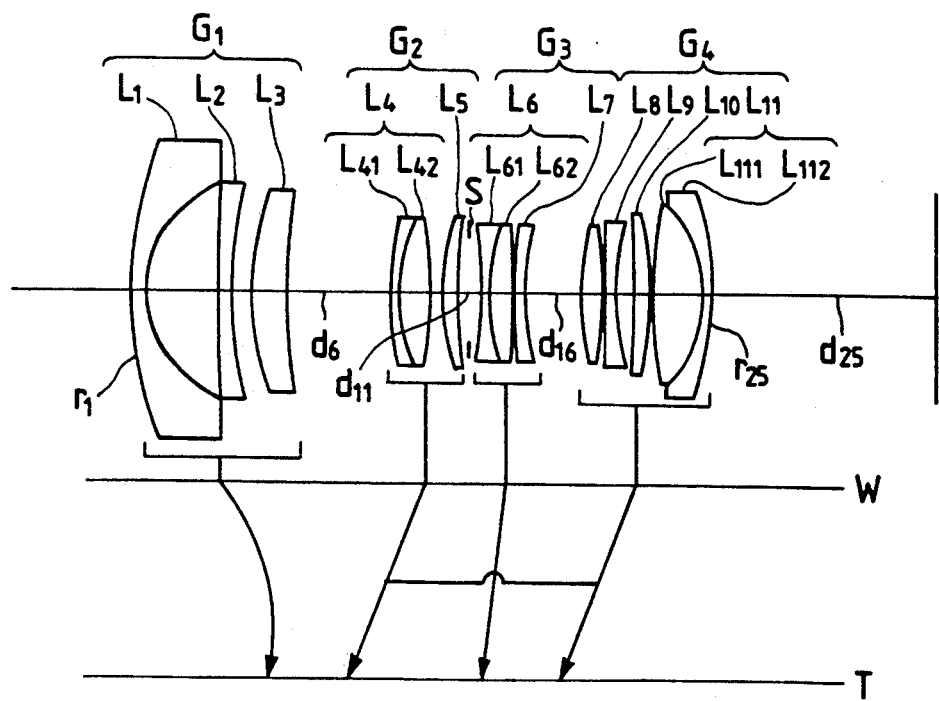
FIG. 7 shows the lens construction of a fourth embodiment of the present invention.

FIG. 7 shows the lens construction of a fourth embodiment and the movement locus of each lens unit by zooming. FIGS. 8(a)–8(c) and FIGS. 8(d)–8(f) show various aberrations at the wide angle side and telephoto side, respectively, of the fourth embodiment. As shown in FIG. 7, there are disposed, in succession from the object side, a first lens unit G1 of negative refractive power, a second lens unit G2 of positive refractive power, a third lens unit G3 of negative refractive power including a stop S, and a fourth lens unit G4 of positive refractive power. This embodiment is a four-unit zoom lens in which the spacing d6 between the first lens unit G1 and the second lens unit G2, the spacing d11 between the second lens unit G2 and the third lens unit G3 and the spacing d16 between the third lens unit G3 and the fourth lens unit G4 vary during zooming. Also, at this time, the second lens unit G2 and the fourth lens unit G4 are moved together. The first lens unit G1 comprises, in succession from the object side, a negative meniscus lens L1 having its convex surface facing the object side, a biconcave lens L2 and a positive meniscus lens L3 having its convex surface facing the object side. The second lens unit G2 comprises, in succession from the object side, a cemented lens L4 comprising a negative meniscus lens L41 having its convex surface facing the object side and a biconvex lens L42, the lenses L41 and L42 being cemented together, and a positive meniscus lens L5 having its convex surface facing the object side. The third lens unit G3 comprises a cemented lens L6 comprising a biconcave lens L61 and a biconvex lens L62 cemented together, and a positive meniscus lens L7 having its convex surface facing the object side. The fourth lens unit G4 comprises, in succession from the object side, a biconvex lens L8, a biconcave lens L9, a positive meniscus lens L10 having its concave surface facing the object side, and a cemented lens L11 comprising a biconvex lens L111 and a negative meniscus lens L112 having its concave surface facing the object side, the lenses L111 and L112 being cemented together.

The focal length f of the entire system in the embodiment of FIG. 7, F value indicative of the brightness thereof, the angle of view 2ω, the radius of curvature ri, the spacing di between adjacent surfaces, the refractive index ndi, the Abbe number νdi and the aspherical surface coefficient are set as follows. The second surface given a mark * is an aspherical surface, and the value of r2 which is the radius of curvature thereof means the radius of curvature on the optical axis. The values of d6, d11, d16 and back focal length d25 varied by zooming are shown in the table below in the relation thereof with the focal length of the entire system.

TABLE 4

(Fourth Embodiment)
Focal length f = 20.6–34
F NO. = 2.9
2ω = 94.5°–64.6°

| i | ri | di | ndi | νdi |
|---|---|---|---|---|
|  | 63.569 | 2.500 | 1.77279 | 49.45 |
| *2 | 15.672 | 12.000 | 1.00000 |  |
| 3 | 528.969 | 2.200 | 1.84042 | 43.35 |
| 4 | 65.982 | 3.500 | 1.00000 |  |
| 5 | 43.826 | 6.000 | 1.80518 | 25.35 |
| 6 | 104.254 | variable | 1.00000 |  |
| 7 | 50.271 | 1.200 | 1.80518 | 25.41 |
| 8 | 23.800 | 5.500 | 1.61720 | 54.01 |
| 9 | −70.110 | 1.913 | 1.00000 |  |
| 10 | 34.954 | 3.000 | 1.72300 | 53.93 |
| 11 | 83.652 | variable | 1.00000 |  |
| 12 | −63.000 | 1.200 | 1.77279 | 49.45 |
| 13 | 33.400 | 4.000 | 1.80518 | 25.35 |
| 14 | −467.820 | 0.200 | 1.00000 |  |
| 15 | 97.414 | 2.000 | 1.77279 | 49.45 |
| 16 | 43.068 | variable | 1.00000 |  |
| 17 | 46.500 | 3.500 | 1.67003 | 46.42 |
| 18 | −66.364 | 0.500 | 1.00000 |  |
| 19 | −530.788 | 2.000 | 1.80384 | 33.89 |
| 20 | 36.947 | 3.000 | 1.00000 |  |
| 21 | −240.000 | 3.000 | 1.69350 | 53.72 |
| 22 | −53.246 | 0.200 | 1.00000 |  |
| 23 | 62.000 | 9.000 | 1.59319 | 67.87 |
| 24 | −19.800 | 1.700 | 1.80458 | 25.50 |
| 25 | −49.454 |  |  |  |

κ = 0.45
C4 = 0.000
C6 = 0.000
C8 = 0.000
C10 = 0.000

| Focal length f of the entire system | 20.6 | 28 | 34 |
|---|---|---|---|
| d6 | 17.827 | 6.741 | 0.619 |

TABLE 4-continued (Fourth Embodiment)
Focal length f = 20.6–34
F NO. = 2.9
2ω = 94.5°–64.6°

| i | ri | di | ndi | νdi |
|---|---|---|---|---|
| d11 |  | 1.379 | 6.339 | 10.198 |
| d16 |  | 9.624 | 4.664 | 0.805 |
| d25 |  | 38.246 | 44.445 | 49.269 | fW = 20.6, fA = −27.54, |fA/fW| = 0.765
fasp = −20.280, |fasp/fw| = 0.985
fp = 89.922, fp/fw = 4.365
fn = −89.894, |fn/fw| = 4.364

Figure 9:
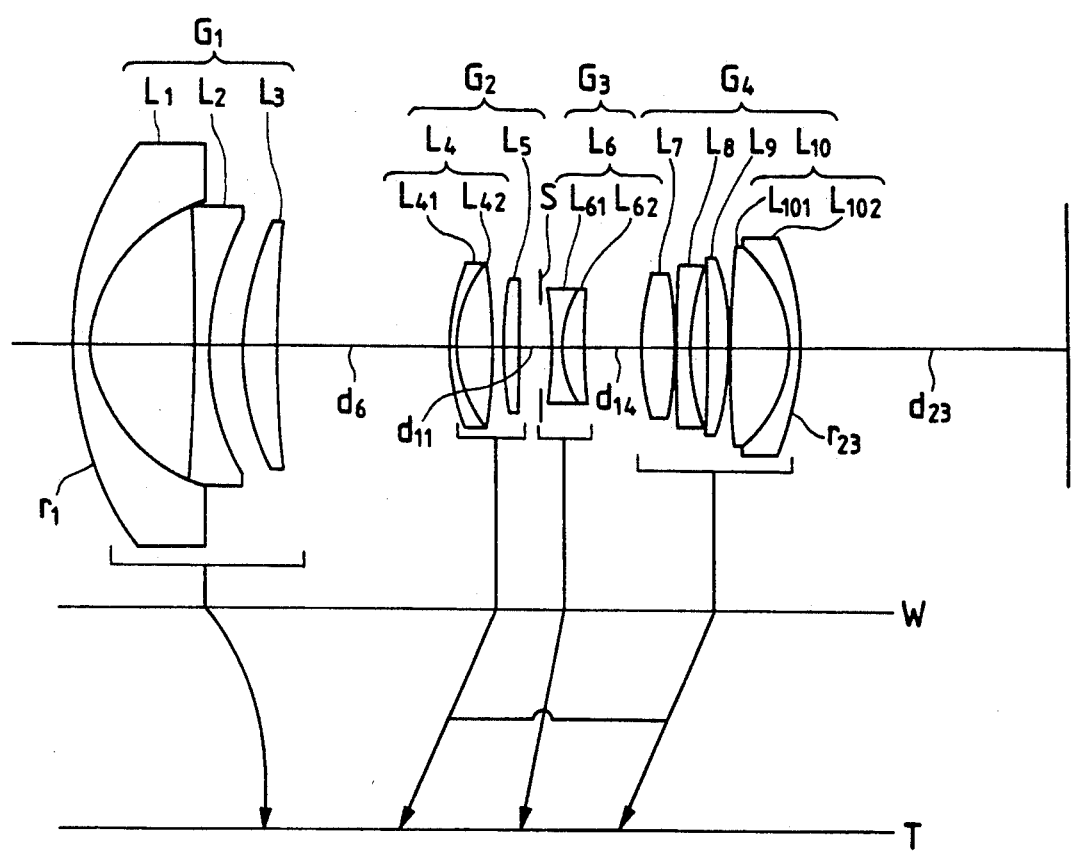
FIG. 9 shows the lens construction of a fifth embodiment of the present invention.
Figure 10A:
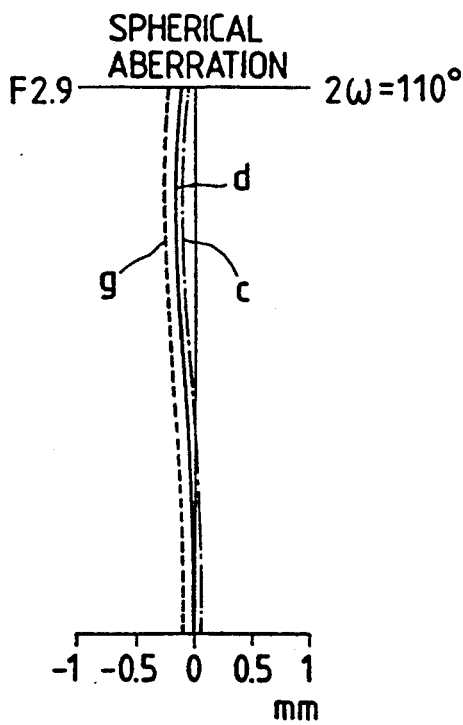
FIGS. 10(a)-10(c) and FIGS. 10(d)-10(f) show various aberrations at the wide angle end and telephoto end, respectively, of the fifth embodiment.
Figures 10B, 10C:
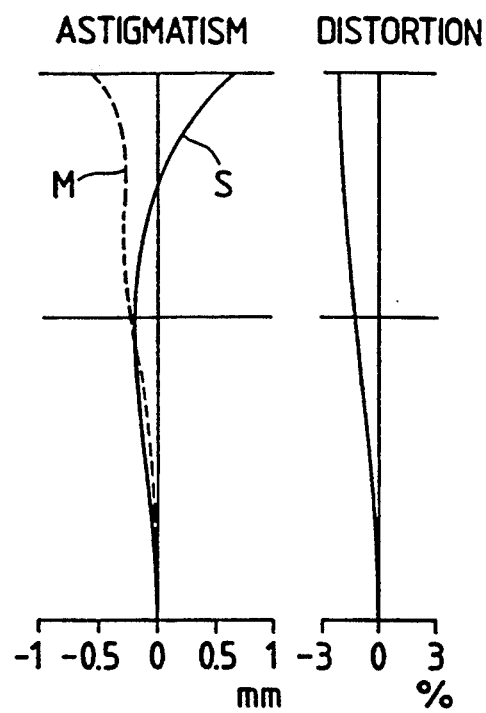
Figure 10D:
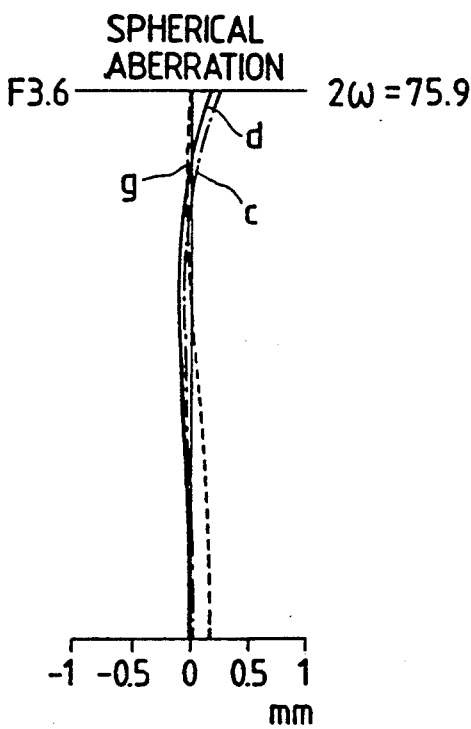
Figures 10E, 10F:
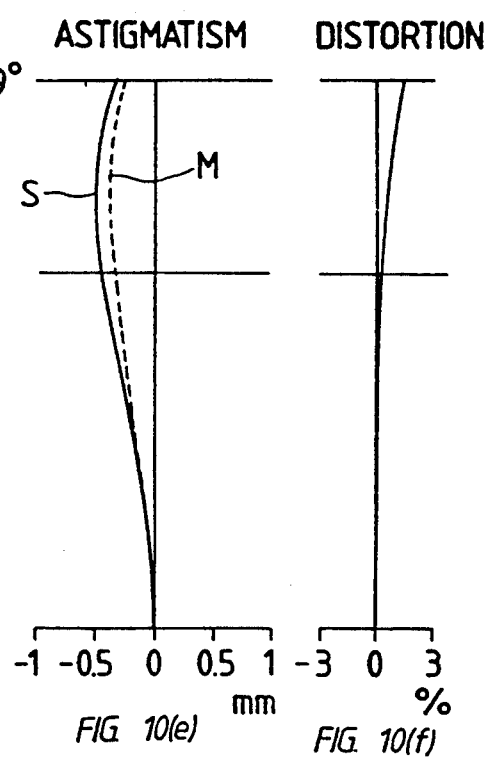

FIG. 9 shows the lens construction of a fifth embodiment and the movement locus of each lens unit by zooming. FIGS. 10(a)–10(c) and FIGS. 10(d)–10(f) show various aberrations at the wide angle side and telephoto side, respectively, of the fifth embodiment. As shown in FIG. 9, there are disposed, in succession from the object side, a first lens unit G1 of negative refractive power, a second lens unit G2 of positive refractive power, a third lens unit G3 of negative refractive power including a stop S, and a fourth lens unit G4 of positive refractive power. This embodiment is a four-unit zoom lens in which the spacing d6 between the first lens unit G1 and the second lens unit G2, the spacing d11 between the second lens unit G2 and the third lens unit G3 and the spacing d14 between the third lens unit G3 and the fourth lens unit G4 vary during zooming. Also, at this time, the second lens unit G2 and the fourth lens unit G4 are moved together. The first lens unit G1 comprises, in succession from the object side, a negative meniscus lens L1 having its convex surface facing the object side, a biconcave lens L2 and a positive meniscus lens L3 having its convex surface facing the object side. The second lens unit G2 comprises, in succession from the object side, a cemented lens L4 comprising a negative meniscus lens L41 having its convex surface facing the object side and a biconvex lens L42, the lenses L41 and L42 being cemented together, and a biconvex lens L5. The third lens unit G3 comprises a cemented lens L6 comprising a biconcave lens L61 and a positive meniscus lens L62 having its convex surface facing the object side, the lenses L61 and L62 being cemented together. The fourth lens unit G4 comprises, in succession from the object side, a biconvex lens L7, a negative meniscus lens having its convex surface facing the object side, a positive meniscus lens L9 having its concave surface facing the object side, and a cemented lens L10 comprising a biconvex lens L101 and a negative meniscus lens L102 having its concave surface facing the object side, the lenses L101 and L102 being cemented together. The focal length f of the entire system in the embodiment of FIG. 9, F value indicative of the brightness thereof, the angle of view 2ω, the radius of curvature ri, the spacing di between adjacent surfaces, the refractive index ndi, the Abbe number νdi and the aspherical surface coefficient are set as follows. The second surface given a mark * is an aspherical surface, and the value of r2 which is the radius of curvature thereof means the radius of curvature on the optical axis. Further, the values of d6, d11, d14 and back focal length d23 varied by zooming are shown in the table below in the relation thereof with the focal length of the entire system.

TABLE 5

(Fifth Embodiment)
Focal length f = 15.5–27.3
F NO. = 2.9–3.6
$2\omega = 110.06°-75.9°$

| i | ri | di | ndi | vdi |
|---|---|---|---|---|
| 1 | 44.913 | 2.500 | 1.78797 | 47.47 |
| *2 | 15.754 | 14.500 | 1.00000 | |
| 3 | −328.018 | 2.000 | 1.80218 | 44.70 |
| 4 | 34.778 | 4.500 | 1.00000 | |
| 5 | 36.438 | 5.000 | 1.74950 | 35.19 |
| 6 | 174.054 | variable | 1.00000 | |
| 7 | 30.163 | 1.200 | 1.80384 | 33.89 |
| 8 | 18.063 | 5.200 | 1.46450 | 65.77 |
| 9 | −62.648 | 1.407 | 1.00000 | |
| 10 | 53.843 | 2.200 | 1.72000 | 50.19 |
| 11 | −2680.597 | variable | 1.00000 | |
| 12 | −43.632 | 1.500 | 1.71300 | 53.93 |
| 13 | 13.830 | 3.000 | 1.72825 | 28.34 |
| 14 | 93.325 | variable | 1.00000 | |
| 15 | 34.869 | 4.500 | 1.50137 | 56.41 |
| 16 | −61.169 | 0.500 | 1.00000 | |
| 17 | 226.288 | 2.000 | 1.79504 | 28.57 |
| 18 | 31.935 | 2.500 | 1.00000 | |
| 19 | −495.542 | 3.000 | 1.59319 | 67.87 |
| 20 | −39.358 | 0.200 | 1.00000 | |
| 21 | 122.675 | 8.300 | 1.60300 | 65.42 |
| 22 | −17.202 | 1.800 | 1.86074 | 23.01 |
| 23 | −33.645 | | | |

$\kappa = 0.51$
$C4 = -4.987 \times 10 - 7$
$C6 = 7.015 \times 10 - 9$
$C8 = -2.808 \times 10 - 11$
$C10 = 5.38 \times 10 - 14$

| Focal length f of the entire system | 15.5 | 24 | 27.3 |
|---|---|---|---|
| d6 | 24.149 | 6.722 | 3.460 |
| d11 | 3.125 | 8.179 | 10.087 |
| d14 | 8.122 | 3.068 | 1.160 |
| d23 | 37.773 | 46.9625 | 50.432 | fW = 15.54   fA = −32.00   |fA/fW| = 0.889
fasp = −19.994, |fasp/fw| = 1.294
fp = 60.546, fp/fw = 3.919
fn = −39.103, |fn|/fw = 2.531

Figure 11:
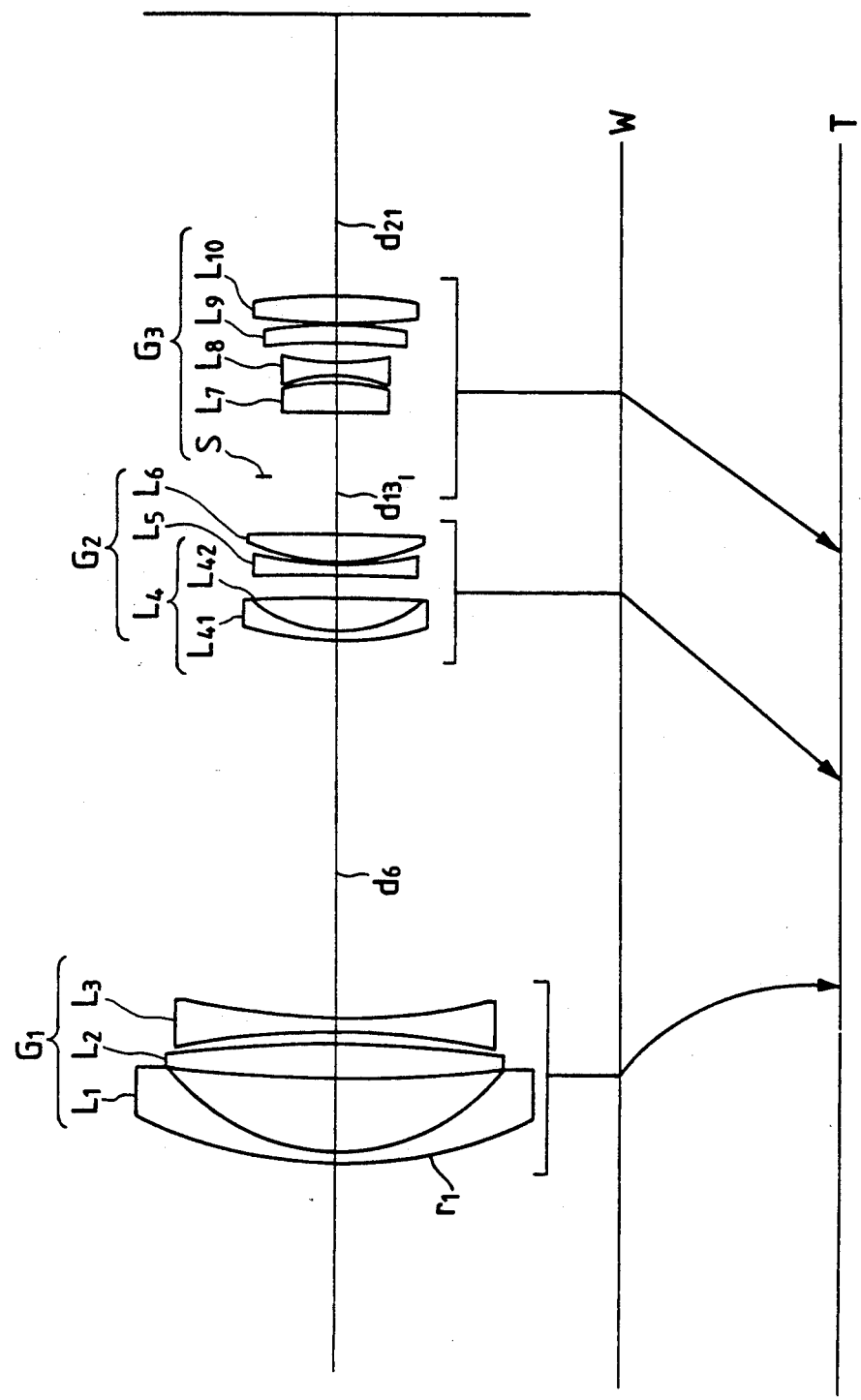
FIG. 11 shows the lens construction of a sixth embodiment of the present invention.

FIG. 11 shows the lens construction of a sixth embodiment and the movement locus of each lens unit zooming. FIGS. 12(a)–12(c) and FIGS. 12(d)–12(f) show various aberrations at the wide angle side and telephoto side, respectively, of the sixth embodiment. As shown in FIG. 11, there are disposed, in succession from the object side, a first lens unit G1 of negative power, a second lens unit G2 of positive power and a third lens unit G3 of negative power including a stop S. This embodiment is a three-unit zoom lens in which the spacing d6 between the first lens unit G1 and the second lens unit G2 and the spacing d13 between the second lens unit G2 and the third lens unit G3 vary during zooming. The first lens unit G1 comprises, in succession from the object side, a negative meniscus lens L1 having its convex surface facing the object side, a biconvex lens L2 and a biconcave lens L3. The second lens unit G2 comprises, in succession from the object side, a cemented lens L4 comprising a negative meniscus lens L41 having its convex surface facing the object side and a biconvex lens L42, the lenses L41 and L42 being cemented together, a biconcave lens L5 and a biconvex lens L6. The third lens unit G3 comprises, in succession from the object side, a positive meniscus lens L7 having its concave surface facing the object side, a biconcave lens L8, a positive meniscus lens L9 having its concave surface facing the object side, and a biconvex lens L10.

The focal length f of the entire system in the embodiment of FIG. 11, F value indicative of the brightness thereof, the angle of view 2ω, the radius of curvature ri, the spacing di between adjacent surfaces, the refractive index ndi, the Abbe number νdi and the aspherical surface coefficient are set as follows. The second surface given a mark * is an aspherical surface, and the value of r2 which is the radius of curvature thereof means the radius of curvature on the optical axis. Further, the values of d6, d13 and back focal length d21 varied by zooming are shown in the table below in the relation thereof with the focal length of the entire system.

TABLE 6

(Sixth Embodiment)
Focal length f = 35.7–68.6
F NO. = 3.5–4.5
$2\omega = 63°-35°$

| i | ri | di | ndi | vdi |
|---|---|---|---|---|
| 1 | 60.000 | 1.500 | 1.67025 | 46.44 |
| *2 | 26.376 | 10.000 | 1.00000 | |
| 3 | 157.982 | 5.000 | 1.86074 | 17.24 |
| 4 | −169.173 | 1.500 | 1.00000 | |
| 5 | −101.291 | 1.800 | 1.64000 | 48.73 |
| 6 | 91.010 | variable | 1.00000 | |
| 7 | 40.317 | 1.500 | 1.75692 | 24.34 |
| 8 | 18.766 | 4.500 | 1.58913 | 49.49 |
| 9 | −168.123 | 3.000 | 1.00000 | |
| 10 | −390.738 | 1.500 | 1.79504 | 21.79 |
| 11 | 54.969 | 0.200 | 1.00000 | |
| 12 | 27.489 | 4.000 | 1.80454 | 30.98 |
| 13 | −508.325 | variable | 1.00000 | |
| 14 | −432.862 | 4.000 | 1.59319 | 54.6 |
| 15 | −32.058 | 1.000 | 1.00000 | |
| 16 | −19.259 | 2.000 | 1.74443 | 39.59 |
| 17 | 45.990 | 2.500 | 1.00000 | |
| 18 | −119.823 | 2.500 | 1.74810 | 42.04 |
| 19 | −60.302 | 0.200 | 1.00000 | |
| 20 | 81.507 | 4.000 | 1.74810 | 42.04 |
| 21 | −62.109 | | | |

$\kappa = 0.74$
$C4 = 3.644 \times 10^{-7}$
$C6 = 5.873 \times 10^{-10}$
$C8 = -9.242 \times 10^{-13}$
$C10 = 1.000 \times 10^{-30}$

| Focal length f of the entire system | 35.7 | 51.6 | 68.7 |
|---|---|---|---|
| d6 | 51.091 | 26.932 | 13.460 |
| d13 | 17.078 | 18.712 | 20.516 |
| d21 | 38.270 | 48.611 | 59.356 | fW = 35.7, fA = −71.502   |fA/fW| = 2.002
fASP = −39.352,   |fASP/fW| = 1.102

As shown in the above embodiments, there can be provided a zoom lens which requires a relatively great angle of view in the preceding negative lens unit and in which distortion is corrected well by the application of the present invention, irrespective of a two-unit construction or a four-unit construction, and irrespective of the specific lens construction of each lens unit. Also, thereby, it becomes possible to realize a super-wide angle zoom lens having a maximum angle of view exceeding 100°. Also, that concave surface of the negative lens in the first lens unit having negative refractive power which is in contact with air is formed by such an aspherical surface which monotonically decreases the curvature thereof away from the optical axis and therefore, it becomes possible to decrease the positive lenses for correcting distortion. This leads to the advantage that the construction of the lens system is simplified and the aperture of the negative meniscus lens disposed most adjacent to the object side becomes smaller and also the volume of the entire lens system becomes smaller.

What is claimed is:

1. A zoom lens in which distortion is corrected well including:

a negative lens unit disposed most adjacent to the object side; and a positive lens unit disposed on the image side of said negative lens unit;

said positive lens unit and said negative lens unit being moved relative to each other on the optical axis thereof when the focal length of the entire system is changed;

said negative lens unit including a negative lens component having its image side surface which is in contact with air formed by a concave surface, the image side concave surface of said negative lens component having an aspherical surface shape whose curvature monotonically decreases away from the optical axis, said aspherical surface being set within a range represented by $$-5 < \kappa < 0.75$$

when the distance in the direction of the optical axis from the vertex of the curved surface at a distance y on the curved surface from the optical axis is x and the curvature of said curved surface at the vertex thereof is C and $C_4, C_6, \ldots$ are constants and $\kappa$ is a cone constant and x is expressed as $$x = Cy^2/\{1+(1-\kappa C^2 y^2)^{\frac{1}{2}}\} + C_4 y^4 + C_6 y^6 + \ldots$$

2. The zoom lens of claim 1, satisfying the following condition:

$$0.5 < |fasp/fW| < 2.0,$$

where fW is the focal length of the entire system at the wide angle end, and fasp is the inverse number of the refractive power of the aspherical surface of said negative lens component on the optical axis.

3. The zoom lens of claim 2, satisfying the following condition:

$$0.5 < |fA/fW| < 2.5,$$

where fA is the focal length of the negative lens component having said aspherical surface.

4. The zoom lens of claim 1, further including:

a second lens unit of negative refractive power disposed on the image side of said positive lens unit, and a second lens unit of positive refractive power disposed on the image side of said second lens unit of negative refractive power.

5. The zoom lens of claim 4, wherein said negative lens unit most adjacent to the object side has a negative lens component and a positive lens component on the image side of the negative lens component having said aspherical surface.

6. The zoom lens of claim 5, satisfying the following conditions:

$$3.5 < fp/fW < 4.5$$

$$2.5 < |fn|/fW < 4.5,$$

where fp is the focal length of the positive lens component in said negative lens unit most adjacent to the object side, and fn is the focal length of the image side negative lens component.

7. The zoom lens of claim 1, further including a second lens unit of positive refractive power disposed on the image side of said positive lens unit.

* * * * *